Dec. 8, 1970 H. KALTSCHMIDT 3,546,698

DEVICE FOR ANGULAR ADJUSTMENT OF THE DIRECTIONAL CHARACTERISTIC OF AN ANTENNA INSTALLATION

Filed Oct. 28, 1968 2 Sheets-Sheet 1

INVENTOR
Horst Kaltschmidt
by McGlew and Toren
ATTORNEYS

Dec. 8, 1970 H. KALTSCHMIDT 3,546,698

DEVICE FOR ANGULAR ADJUSTMENT OF THE DIRECTIONAL CHARACTERISTIC OF AN ANTENNA INSTALLATION

Filed Oct. 28, 1968 2 Sheets-Sheet 2

INVENTOR
Horst Kaltschmidt by McGlew and Toren
ATTORNEYS 3,546,698

DEVICE FOR ANGULAR ADJUSTMENT OF THE DIRECTIONAL CHARACTERISTIC OF AN ANTENNA INSTALLATION

Horst Kaltschmidt, Neubiberg, Germany, assignor to Bolkow Gesellschaft mit beschrankter Haftung, Ottobrunn, Munich, Germany Filed Oct. 28, 1968, Ser. No. 770,913
Claims priority, application Germany, Nov. 3, 1967, 1,566,855
Int. Cl. G01s 9/02, 9/66
U.S. Cl. 343—16 8 Claims

ABSTRACT OF THE DISCLOSURE

A device for angular adjustment of the directional characteristic of an antenna installation includes a first hollow sphere having preferably flattened ends and with a plurality of individual emitters arranged circumferentially thereof and actuable by a capacitive goniometer. A second hollow sphere is separate from and smaller than the first hollow sphere and has arranged, on its inner surface, respective first plates of the coupling condensers of the goniometer. A third hollow sphere is within and smaller than the second hollow sphere and has arranged, on its surface, the respective second plates of the coupling condensers. Means mount the third hollow sphere for angular displacement, in the second hollow sphere, about at least one of three mutually perpendicular axes of the second hollow sphere. Preferably, the first and second hollow spheres are fixed relative to a carrying vehicle, such as a waterborne vehicle, which may pitch or roll. The third or inner hollow sphere is stabilized to be stationary relative to a fixed reference system.

BACKGROUND OF THE INVENTION

Antenna systems, for active or passive direction finding or locating of objects by means of high frequency or sonic energy, are known. In dependence on the frequency range, the dimensions of the antenna installations may often be so large that angular adjustment of the entire antenna installation by mechanical means is impossible, for reasons of mass inertia. For this reason, systems have been proposed, for high frequency as well as for acoustical direction finders, where the individual emitters of the antenna installation are arranged in mechanically fixed relation and are electrically connected by means of coupling condensers with a revolving collector or so-called capacitive goniometer. This capacitive goniometer effects angular adjustment of the directional characteristic of the transmitting lobe, the receiving lobe, or both. Such an arrangement is shown, for example, in German provisional Pat. 1,047,882.

Such goniometers and antenna installations have become known, especially in acoustical direction finding or locating systems which are used, for example, in connection with water craft, for navigation and location of submarines. In this case, they consist of a cylinder which is fixedly connected with the body of the water craft. The outer shell of this cylinder carries, as individual emitters, electro-acoustical energy transducers. These transducers are electrically connected, through respective coupling condensers, with a further cylinder which is angularly adjustable in the interior of the hollow cylinder carrying the individual emitters. Using the capacitive goniometer thus formed, it is possible, in conjunction with a fixed antenna installation, to angularly adjust its directional characteristic electrically and to effect passive as well as active location of objects in any horizontal direction. Such an arrangement is disclosed, for example, in "Electronics," for Jan. 3, 1958, pages 56–62.

However, such goniometers and antenna installations have not proved to be fully sufficient for surface craft, since they provide for angular adjustment of the directional characteristic only in a horizontal plane. Thus, observation or approximately accurate depth determination, of objects located at depths below the water surface, is not feasible. Moreover, the undesired migration of the directional characteristic of such an antenna system, due to the substantially greater rolling and pitching of surface crafts, due to swells, for example, has a disturbing effect.

SUMMARY OF THE INVENTION

This invention relates to a device for angular adjustment of the directional characteristic of an antenna installation and, more particularly, to an improved device for this purpose by means of which the directional characteristic of an antenna installation may be angularly adjusted about any one of three mutually perpendicular axes of a reference system which is stationary in space.

The objective of the invention is to improve devices for angular adjustment of the directional characteristics of antenna installations, more specially those used in sonar technology and consisting of an antenna installation and a goniometer. The purpose of the invention is to provide such a device which is particularly useful in connection with surface craft and independently of prevailing sea conditions, while providing for a sufficiently accurate observation of objects located at relatively great depths below the surface.

The device of the present invention is based upon an antenna installation which includes a plurality of individual emitters arranged on the circumference of a hollow body and actuable through a capacitive goniometer. In accordance with the invention, this hollow body preferably is a sphere which is slightly flattened at opposite ends of one axis, and respective first plates of coupling condensers of the goniometer are arranged on the inner surface of a similar, but smaller, second hollow sphere. The respective other or second plates of the coupling condensers are arranged on the surface of an inner or third hollow sphere which is mounted for angular adjustment about any one or more of three mutually perpendicular axes of the second hollow sphere.

By the startlingly simple expedient of replacing the known hollow cylinders of such antenna installations and goniometers by a hollow sphere, and reproducing this hollow sphere by means of a smaller hollow sphere, it is possible to angularly adjust the directional characteristic of such an antenna installation about both vertical and horizontal axes of the hollow body. At the same time, it is possible to move a third inner sphere, relative to the second hollow sphere in such a manner that the inner sphere remains, during any undesired movement of the first hollow sphere carrying the individual emitters and fixedly connected, for example, with a hull or body of a ship, in a fixed position with respect to a stationary reference axis. Since the second hollow sphere, which is a smaller reproduction of the first hollow sphere carrying the individual emitters, is firmly or fixedly connected with the hull, all relative movements between the inner sphere and the second hollow sphere act electrically also on the larger sphere carrying the individual emitters. In so doing, such movements stabilize the then desired direction of radiation of the antenna relative to the movements of the ship.

In a preferred embodiment of the invention, each individual emitter, arranged on the outer surface of the first hollow sphere, is associated with a first plate, of the coupling condensers, provided at a corresponding point of the second hollow sphere. The respective second plates of the coupling condensers are arranged in or at the inner hollow sphere. Amplitude staggering and transit time units, a transmitting oscillator and receiving equipment are fixedly arranged within the inner hollow sphere.

In accordance with an advantageous embodiment of the invention, two capacitive goniometers, of basically identical construction, are provided, one effecting angular adjustment of the directional characteristics for a transmitting operation and the other effecting angular adjustment of the directional characteristic for a receiving operation.

In accordance with a preferred application of a device embodying the invention, the first and second hollow spheres are fixedly connected with a vehicle, such as a waterborne vehicle or vessel, which is moving with relation to a stationary reference system, while the inner sphere or the inner spheres are automatically so movable, in relation to the associated second hollow spheres, that the axes of the inner sphere or spheres remain stationary with respect to such stationary reference system.

An object of the invention is to provide an improved device for angularly adjusting the directional characteristics of an antenna system.

Another object of the invention is to provide such a device which is operable irrespective of pitch or roll of a waterborne craft.

A further object of the invention is to provide such a device providing for relatively accurate observations of objects located at substantial depths below the surface of water, with reference to a surface craft.

Still another object of the invention is to provide such a device comprising a first hollow sphere having a plurality of individual emitters arranged on its spherical surface, a smaller and similar second hollow sphere having first plates of respective coupling condensers associated with the individual emitters arranged on its spherical surface, and a third hollow sphere, within the second hollow sphere, carrying the second plates of the respective coupling condensers.

A further object of the invention is to provide such a device in which the second and third hollow spheres constitute capacitive goniometers, and two such capacitive goniometers, of basically identical construction, are provided, one effecting angular adjustment of the directional characteristic for transmitting operations and the other effecting such angular adjustment of the directional characteristic for receiving operations.

Yet another object of the invention is to provide such a device in which the first and second hollow spheres are fixedly connected with a vehicle moving in relation to a stationary reference system, with the third sphere being automatically movable relative to the second sphere in a manner such that the axes of the third sphere remain stationary.

For an understanding of the principles of the invention, reference is made to the following description of a typical embodiment thereof as illustrated in the accompanying drawings.

DESCRIPTION OF THE PREFERRED EMBODIMENT

Figure 1:
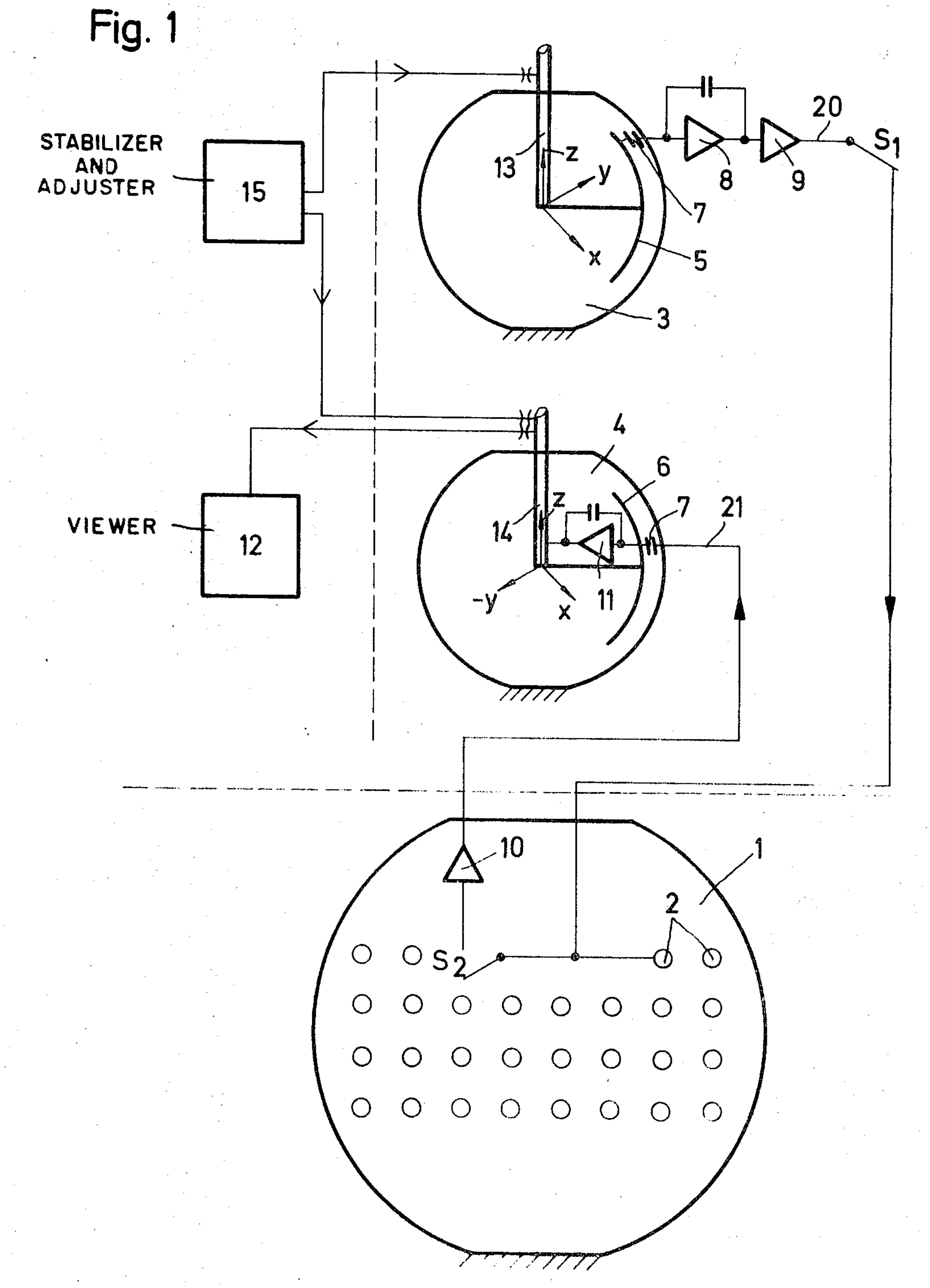
FIG. 1 is a diagrammatic representation of one embodiment of the device in accordance with the invention.

In the embodiment of the invention shown in FIG. 1, a first hollow sphere 1 has arranged, on its generated spherical surface, a plurality of individual emitters 2. Preferably, hollow sphere 1 is slightly flattened at both ends of an axis thereof. In a manner which has not been shown in detail, hollow sphere 1 is fixedly connected with a supporting vehicle, such as the hull of a waterborne surface craft.

Hollow spheres 3 and 4, which are smaller reproductions of hollow sphere 1 carrying the individual emitters 2, are likewise connected fixedly with the supporting vehicle and separately from hollow sphere 1. Inside the respective hollow spheres 3 and 4, inner spheres 5 and 6, shown in FIG. 1 only as sections, are rotatably supported in a manner such that a relative movement of the inner spheres 5 and 6 about three mutually perpendicular axes $x$, $y$ and $z$, relative to the associated hollow spheres 3 and 4, is possible.

On the inner spherical surfaces of hollow spheres 3 and 4 there are arranged first plates of coupling condensers 7 in such a manner that each individual emitter 2, on the spherical surface of hollow sphere or body 1, has associated with it a respective coupling condenser at the corresponding point of the hollow spheres 3 and 4. As illustrated, these first plates of coupling condensers 7 are connected, through conductors such as 20 and 21, with the associated individual emitters 2 on hollow sphere or body 1. Through electrical conductors 20, hollow sphere 3, in cooperation with individual emitters 2, serves for a transmitting operation and, through electrical conductors 21, hollow sphere 4, in association with the individual emitters 2, serves for receiving operations.

During transmission operations, the electrical signals furnished, through coupling condensers 7, from inner sphere 5 to hollow sphere 3 are transmitted to the individual emitters 2 of hollow sphere 1 through a respective first amplifier 8, designed as a capacitive adding amplifier, a respective power amplifier 9 and through a respective conductor 20 and a respective switch $S_1$ to the respective individual emitter 2 connected with the associated coupling condensers 7.

During receiving operation, the electrical signals received by the individual emitters 2 are transmitted through the then closed respective switch $S_2$, a respective amplifier 10, and through the respective connection 21 to the respective coupling condenser 7. The respective coupling condenser 7. The respective coupling condenser 7 transmits the received signals from hollow sphere 4 to inner hollow sphere 6, and thence through another respective capacitive adding amplifier 11 and, in a manner not shown, to a viewer 12 at an evaluation center.

The vertical axes 13 and 14 of the respective inner spheres 5 and 6 are spatially stabilized in a known manner, which accordingly has not been illustrated in detail. and shown, for example, in German Pat. 767,961. For example, the vertical axes are maintained in a certain constant position with respect to a stationary reference system and independently of the position of a ship, for example, to which are rigidly connected the hollow spheres 1, 3 and 4. In addition, inner spheres 5 and 6 can be angularly adjusted about their respective axes 13 and 14 in the desired manner, relative to the associated hollow spheres 3 and 4, in order to actuate different individual emitters 2 arranged on hollow sphere 1. Thereby, angular adjustment of the directional characteristic of the antenna installation formed by the individual emitters 2 is effected in a desired manner in azimuth as well as in elevation. For this purpose, there is provided, at the evaluation center, another unit 15 which effects automatic stabilization of inner spheres 5 and 6 as well as effecting a desired relative movement between inner spheres 5 and 6 and the associated respective hollow spheres 3 and 4.

Capacitive adding amplifiers 8 and 11, which are known per se, for example, from analog computing in connection with function condensers, are particularly advantageous for such capacitive goniometers as desired in the form of two concentric spheres. Reference is made, for example, to Steinbuch, Taschenbuch der Nachrichtenverarbeitung (Manual of Communication Processing) 1962, pages 1205 to 1207. The capacitive adding amplifiers are particularly advantageous since, with a movement of the inner spheres with respect to the associated second hollow spheres, and the resultant intermediate positions of the plates of individual coupling condensers 7, intermediate signals resulting from simple addition are formed at the outputs of the capacitive adding amplifiers. Additionally, the plates of coupling condensers 7, connected through the capacitive adding amplifiers, are grounded with respect to alternating current, so that any interference pickup is ineffective. With the aid of the capacitive adding amplifiers, moreover, a frequency-independent transmission through coupling condensers 7 and down to the lowest frequencies is possible. This is advantageous especially in sonar technology with its extremely low-frequency signals.

Figure 2:
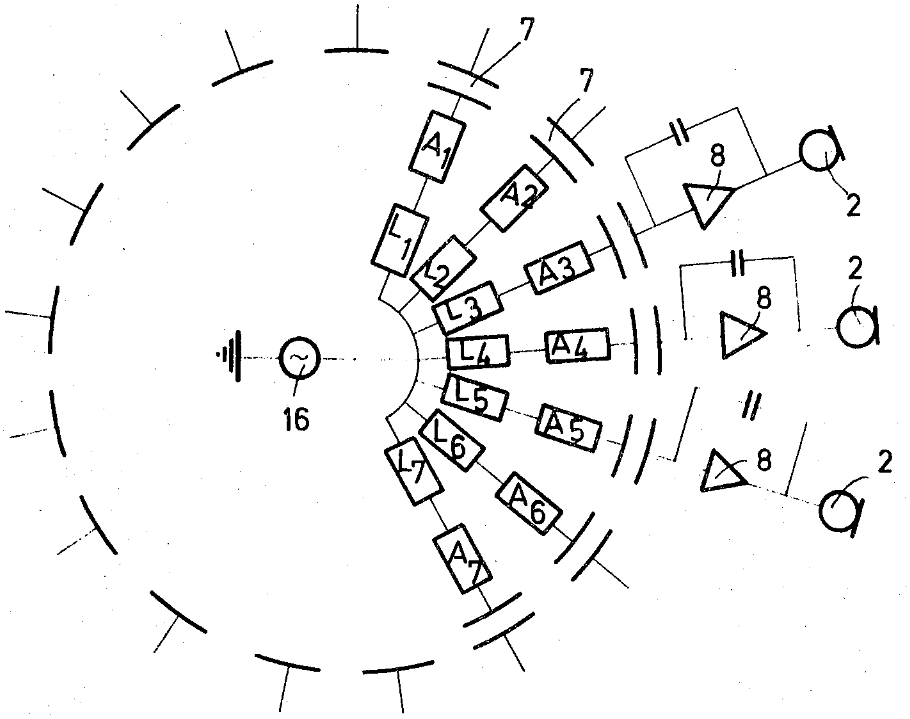
FIG. 2 is a diagrammatic representation of the arrangement of the electrical components of the goniometer for transmitting operation.

Referring now to FIG. 2, which diagrammatically illustrates the electrical components of an inner sphere 5 and an associated outer sphere 3, for transmitting operations, a transmitting oscillator is indicated at 16. Oscillator 16 is connected with coupling condensers 7 through a plurality of transit time or phase shift units $L_1$, $L_2$, $L_3$ . . . $L_n$ and amplitude staggering units $A_1$, $A_2$, $A_3$ . . . $A_n$ which are respective to individual coupling condensers 7. The first plates of the coupling condensers on the hollow sphere 3 are connected, through respective capacitive adding amplifiers 8, with the associated individual emitters 2 on the first hollow sphere 1. The transit time units and amplitude staggering units are adjustable, as desired, in such a way that, upon simultaneous feeding of an entire group of individual emitters 2, there is attained, by the different transit times, a certain directional characteristic of the overall antenna formed by the individual emitters 2.

Since the inner phere 5, carrying the transmitting oscillator 16 and the transit time units and amplitude staggering units, is space-stabilized relative to hollow sphere 3, with every movement of, for example, a ship to which hollow sphere 3 and hollow sphere 1 are fixedly connected, different individual emitters 2 are fed through coupling condensers 7. Thereby, the desired directional characteristic of the antenna installation also remains stationary, irrespective of whether the ship rolls or pitches, for example, due to high swells, or makes a sudden change of course.

In the same manner as known devices, the device of the invention can be used for both active location of objects and passive location of objects, operating selectively with a revolving transmitting lobe in an omnidirectional receiving characteristic, with an omnidirectional transmitting characteristic and a revolving receiving lobe, or with revolving transmitting and receiving lobes.

While the device of the invention has been explained with respect to a particular embodiment particularly advantageous for sonar technology, it will be understood that the invention device is not limited either to operation as an acoustical direction finder or to use in sonar technology. It can be used with equal advantage and analogously also as a high-frequency direction finder, for example, on a high transmission mast which is subject to swaying under wind pressure.

What is claimed is:

1. A device for angular adjustment of the directional characteristics of an antenna installation including a plurality of individual emitters, arranged circumferentially of a hollow body, actuable by a capacitive goniometer, said device comprising, in combination a first hollow sphere constituting said hollow body, fixed on a support surface, and having said emitters arranged on its spherical surface; a second hollow sphere, fixed on a support surface, identical with but smaller than said first hollow sphere, and spaced apart from said first hollow sphere, and having arranged, on its inner spherical surface, respective first plates of the coupling condensers of said goniometer; means connecting each individual emitter with a first plate of a respective coupling condenser and which is provided at the corresponding point of said second hollow sphere; a third hollow sphere, identical with but smaller than said second hollow sphere, within said second hollow sphere and concentric therewith, and having arranged, on its spherical surface, respective second plates of all of said coupling condensers; means mounting said third hollow sphere for angular displacement, in said second hollow sphere, about three mutually perpendicular axes of said second hollow sphere; and respective capacitive adding amplifiers each connected in series with a respective coupling condenser in the circuit including the first and second plates of the respective coupling condenser and the associated individual emitter.

2. A device for angular adjustment of the directional characteristic of an antenna installation, as claimed in claim 1, in which each said spheres is slightly flattened at opposite ends of an axis thereof.

3. A device for angular adjustment of the directional characteristic of an antenna installation, as claimed in claim 1, in which the second plates of said coupling condensers are arranged on the spherical surface of said third hollow sphere; a transmitting oscillator in said third hollow sphere; receiving devices in said third hollow sphere; and respective amplitude staggering units and respective transit time shift units connecting said oscillator to the respective second plates of the coupling condensers, and positioned within said third hollow sphere.

4. A device for angular adjustment of the directional characteristic of an antenna installation, as claimed in claim 3, in which said transit time shift units comprise phase shift units.

5. A device for angular adjustment of the directional characteristic of an antenna installation, as claimed in claim 1, including two capacitive goniometers operatively connected to said individual emitters on said first hollow sphere; each goniometer including a respective said second hollow sphere and a respective said third hollow sphere; one goniometer effecting angular adjustment of the directional characteristic during transmitting operations and the other goniometer effecting angular adjustment of the directional characteristic during receiving operations.

6. A device for angular adjustment of the directional characteristic of an antenna installation, as claimed in claim 5, in which each of said third hollow spheres has mounted thereon respective second plates of the associated coupling condensers; the third hollow sphere of said one goniometer mounting therewithin an oscillator and means connecting said oscillator to the associated second plates of said coupling condensers; said third hollow sphere of said other goniometer having mounted therewithin receiving means connected to the second plates of said coupling condensers.

7. A device for angular adjustment of the directional characteristic of an antenna installation, as claimed in claim 5, in which the respective capacitive adding amplifiers of said one goniometer connect the first plates of the coupling condensers of said one goniometer to the associated individual emitters and act as transmitting amplifiers; the respective capacitive adding amplifiers of said other goniometer being connected to the second plates of the coupling condensers of said other goniometer and acting as receiving amplifiers.

8. A device for angular adjustment of the directional characteristic of an antenna installation, as claimed in claim 1, in which said first and second hollow spheres are fixedly connected with a vehicle moving relative to a stationary reference system; and means automatically moving said third hollow sphere relative to said second hollow sphere in a manner such as to maintain the axes of said third hollow sphere stationary in space relative to said stationary reference system.

References Cited

UNITED STATES PATENTS

| | | | |
|---|---|---|---|
| 2,466,354 | 4/1949 | Bagnall | 343—100(.6)X |
| 2,769,159 | 10/1956 | Moore | 340—6X |
| 3,144,631 | 8/1964 | Lustig et al. | 340—3(PR) |
| 3,277,481 | 10/1966 | Robin et al. | 343—100 |

FOREIGN PATENTS

| | | | |
|---|---|---|---|
| 369,360 | 3/1932 | Great Britain | 343—100 |
| 566,823 | 6/1931 | Germany | 340—6 |

RODNEY D. BENNETT, Primary Examiner

T. H. TUBBESING, Assistant Examiner

U.S. Cl. X.R.

340—3, 6; 343—100, 124, 854, 876